United States Patent
Ando et al.

(10) Patent No.: US 6,990,813 B2
(45) Date of Patent: Jan. 31, 2006

(54) APPARATUS FOR CONTROLLING VARIABLE NOZZLE OF TURBOCHARGER

(75) Inventors: Yoshiyuki Ando, Yokohama (JP); Haruo Saito, Yokohama (JP); Takaaki Sekine, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 0 days.

(21) Appl. No.: 10/875,535

(22) Filed: Jun. 25, 2004

(65) Prior Publication Data

US 2005/0005605 A1     Jan. 13, 2005

(30) Foreign Application Priority Data

Jun. 26, 2003 (JP) .......................... P2003-182500
Sep. 10, 2003 (JP) .......................... P2003-317937

(51) Int. Cl.
F02B 33/44    (2006.01)
F02B 37/12    (2006.01)
F02B 37/24    (2006.01)

(52) U.S. Cl. .......................... 60/602; 60/611; 415/162; 415/164

(58) Field of Classification Search ............... 60/602, 60/611; 415/160, 162, 163, 164
See application file for complete search history.

(56) References Cited

U.S. PATENT DOCUMENTS

| | | | | |
|---|---|---|---|---|
| 4,804,316 A | * | 2/1989 | Fleury | 415/164 |
| 5,996,347 A | * | 12/1999 | Nagae et al. | 60/602 |
| 6,067,798 A | * | 5/2000 | Okada et al. | 60/602 |
| 6,233,934 B1 | | 5/2001 | Church et al. | 60/602 |
| 6,397,597 B1 | * | 6/2002 | Gartner | 60/602 |
| 6,558,117 B1 | * | 5/2003 | Fukaya et al. | 415/164 |
| 6,594,995 B2 | * | 7/2003 | Heyes | 60/602 |
| 6,637,205 B1 | * | 10/2003 | Ahmad et al. | 60/611 |
| 6,694,734 B2 | * | 2/2004 | Akao et al. | 60/611 |
| 6,729,134 B2 | * | 5/2004 | Arnold et al. | 60/602 |
| 6,736,595 B2 | * | 5/2004 | Jinnai et al. | 60/602 |
| 6,769,255 B2 | * | 8/2004 | Nishiyama et al. | 60/602 |
| 6,851,256 B2 | * | 2/2005 | Chamoto et al. | 60/602 |
| 2003/0084886 A1 | | 5/2003 | Akao et al. | 60/605.1 |
| 2003/0185672 A1 | * | 10/2003 | Suganami et al. | 415/160 |

FOREIGN PATENT DOCUMENTS

| EP | 1304462 A2 * | 4/2003 |
|---|---|---|
| JP | 2001-107738 | 4/2001 |
| WO | WO 03/036062 | 5/2003 |

\* cited by examiner

*Primary Examiner*—Sheldon J Richter
(74) *Attorney, Agent, or Firm*—McGinn IP law Group, PLLC

(57) ABSTRACT

A negative feedback control operation is performed in the electronic control actuator. Thus, a motor and a gear rotate the output shaft until the actual angle signal becomes nearly equal to the target angle signal. The turn of the output shaft of the electronic control actuator is transmitted to nozzle vanes of a turbocharger through a lever and a rod, so that the opening of the nozzle vane is controlled.

2 Claims, 3 Drawing Sheets

APPARATUS FOR CONTROLLING VARIABLE NOZZLE OF TURBOCHARGER

The present application is based on Japanese Patent Applications Nos. 2003-182500 and 2003-317937, the entire contents of which are incorporated herein by reference.

BACKGROUND OF THE INVENTION

1. Field of the Invention

The present invention relates to an apparatus for controlling variable nozzles of a turbocharger, which controls the opening of a vane of each of the variable nozzles of the turbocharger mounted on an automobile through the use of an electronic control actuator.

2. Related Art

Hitherto, as an example of this kind of techniques, there has been provided a variable nozzle turbocharger control apparatus for an internal combustion engine, which is disclosed in JP-A-2001-107738. FIG. 4 shows the configuration thereof.

To give a description thereof, reference numeral 1 designates a turbocharger that has a center housing, a compressor housing, and a turbine housing.

The turbocharger 1 is provided with an air intake inlet port 1a from which air is introduced, and a compressed air supply hole 1b for supplying air, which is compressed by the turbocharger 1, to an engine 2. Also, an exhaust gas sucking port 1c to which an exhaust gas is supplied from the engine 2, and an exhaust port for exhausting the exhaust gas are provided therein. Variable nozzles (not disclosed therein) provided in the turbocharger 1 are disposed between the center housing and the turbine housing. Reference numeral 3 denotes a stepping motor. An operation piece 4 is operated by being driven by this stepping motor 3. Ring plates provided in the variable nozzles are pressed in the same direction. The size of the gap between the vanes of the mutual variable nozzles is adjusted. The flow rate of the exhaust gas blown against turbine wheels is adjusted. Reference numeral 5 designates an engine ECU (Electronic Control Unit), to which detection outputs of various kinds of sensors provided in the engine are inputted. The operation status of the engine is distinguished according to these detection outputs. Thus, the stepping motor 3 is driven and controlled. Consequently, the opening of each of the nozzle vanes of the variable nozzles is open/close-controlled. The flow rate of the exhaust gas blown against the turbine wheels is adjusted. Also, an amount of air to forcibly be fed for combustion is adjusted.

In the figure, reference numeral 6 denotes a radiator, which is connected to the engine 2. Coolant water for the engine 2 is cooled down by circulating in the radiator 6.

Then, according to this related art, the variable nozzle turbo charger control apparatus for an internal combustion engine is adapted so that upon occurrence of abnormality therein, upon cold start thereof, or upon idling thereof, the control of the position of each of the nozzle vanes is performed in the vicinity of a fully opened position of the variable nozzle by setting the fully opened position thereof as an initial position thereof.

Also, another example of the related art is configured in such a way as to have a duty solenoid valve, the opening of which is adjusted by adjusting an air pressure through the use of an actuator, for example, a negative pressure actuator to thereby adjust an amount of intake air of the engine. Further, the duty solenoid valve operates by receiving a control signal from an engine ECU disposed among a pressure adjusting chamber, a negative pressure chamber, and an atmospheric pressure chamber of the engine. The negative pressure chamber of the engine receives a negative pressure from a vacuum pump and adjusts the pressure and causes the negative pressure actuator to operate. The opening of the variable nozzle provided in the turbocharger and used for enabling the flow rate of the exhaust gas to vary is controlled by the operation of the negative pressure actuator.

[Patent Document 1] JP-A-2001-107738

As described above, the related art according to the JP-A-2001-107738 is configured as follows. That is, in the variable nozzle turbocharger control apparatus for an internal combustion engine, the variable nozzles, which are operated by the operation piece 4, are provided in a path of the exhaust gas blown against the turbine wheels. The flow rate of the exhaust gas is adjusted by opening and closing the variable nozzles through the use of the ring plates. Upon occurrence of abnormality in the variable nozzle turbocharger control apparatus for an internal combustion engine, upon cold start thereof, or upon idling thereof, the opening of each of the nozzle vanes is controlled by determining the initial positions of the variable nozzles. Also, drive-operations of the vanes of the variable nozzles are performed by rotation operations of the stepping motor 3.

Thus, according to this related art, the openings of the vanes of the variable nozzles are uniformly identified and determined according to the initial positions of the variable nozzles. Because of open-loop control, when deformation occurs in the operation piece and so on, the opening of each of the vanes is deviated from a target opening, so that correction control cannot be achieved. Consequently, it has been difficult to rationally control the position of each of the nozzle vanes in real time.

An object of the invention is to control an actual opening position of the vane of each of the variable nozzles by providing an electronic control actuator in a system or apparatus according to the invention, by calculating a vane opening target position of each of the variable nozzles, which is to be realized by an electronic control actuator, according to vane indication opening information supplied from an engine ECU through a control signal line to thereby control the opening of the vane of each of the variable nozzles provided in a turbocharger, and by furthermore indirectly detecting an actual opening position of each of the variable nozzles through the use of an angle sensor and rationally controlling the opening of the vane of each of the variable nozzles through the use of a feedback loop, which is a closed loop, in real time, and to surely drive the vane of each of the variable nozzles within an angle of rotation (or turn) thereof by setting an angle of rotation (or turn) of an output shaft of the electronic control actuator to be larger than the angle of rotation (or turn) of the vane of each of the variable nozzles.

Further, in addition to the aforementioned object, another object of the invention is to prevent severe collision between a lever, which is connected to the output shaft, and a stopper in a fully opened or closed position due to aged deterioration of inner mechanisms or various kinds of elements, which is resulted from long-term use thereof, and to change in ambient temperature and to variation in voltage and in external load by setting a fully opened or closed offset region that is used by a calculating device, which is provided in an electronic control circuit of the electronic control actuator, so as to preliminarily regulate and control opening/closing operations of the lever of the turbocharger within the entire mechanical operating region, and is also to prevent damage and breakage of inner constituent components of the electronic control actuator, which would be caused by such a collision.

SUMMARY OF THE INVENTION

The invention is accomplished to achieve the aforementioned objects, and has the following constituents or means.

According to the invention, there is provided an apparatus (hereunder referred to as a first apparatus of the invention) for controlling a variable nozzle of a turbocharger, which has an electronic control actuator for controlling an opening of a vane of the variable nozzle of the turbocharger according to an indication signal from an engine ECU for controlling an engine provided with the turbocharger having the variable nozzle. In this apparatus, the electronic control actuator has an output shaft enabled to rotate within a range of an angle θa. The variable nozzle is enabled to move within a range of an angle θb (θb<θa) between a first stopper and a second stopper. This apparatus comprises an angle sensor for detecting an angle, by which the variable nozzle moves within a range of the angle θb between the first stopper and the second stopper, in terms of an movement angle of the output shaft and for generating an angle signal, and an electric control circuit, to which the angle signal generated by the angle sensor is supplied, for storing angle signals respectively generated by the angle sensor in a position, in which the variable nozzle collides with the first stopper, and a position, in which the variable nozzle collides with the second stopper, as a first collision position signal and a second collision position signal, for storing angle signals, which respectively differ from the first collision signal and the second collision signal by a predetermined first offset angle θα and a predetermined second offset angle θβ, as a first limit position signal and a second limit position signal, and for generating a control signal, according to which the output shaft of the electronic control actuator is driven within a range of an angle θc (θc<θb) between a first limit position and a second limit position, which are respectively represented by the first limit position signal and the second limit position signal.

According to an embodiment (hereunder referred to as a second apparatus of the invention) of the first apparatus of the invention, the electronic control actuator comprises a motor driver connected to the electronic control circuit, a motor portion driven by the motor driver, and a decelerator connected to the motor portion and to the output shaft of the vane of the variable nozzle of the turbocharger. The second apparatus further comprises an angle signal converting device, to which opening indication information designating an opening of the vane of the variable nozzle sent from the engine ECU is supplied, for converting the opening indication information to a target angle signal representing a target angle signal of the output shaft, a comparing device for comparing the target angle signal generated by the angle signal converting device with an actual angle signal representing an actual angle of the output shaft, which is generated by the angle sensor, and a lever control range setting device for performing computation on the angle signals sent from the angle sensor, for storing resultant signals as a first collision position signal and a second collision position signal, for storing angle signals representing angles respectively differing from a first limit position and a second limit position by a predetermined first offset angle θα and a predetermined second offset angle θβ as a first limit position signal and a second limit position signal, and for supplying the first limit position signal and the second limit position signal to the angle signal converting device. In this apparatus, the angle signal converting device generates a target angle signal representing a target angle included in the range of the angle θc.

The apparatus for controlling the variable nozzles of the turbocharger according to the invention has the aforementioned means for solving the problems. Thus, the invention has the following advantages.

According to the first apparatus of the invention, upon assembling of the turbocharger, the fully opened or closed offset region is set so as to regulate and control the opening/closing operations of the lever within a mechanical operating region. Thus, the invention has advantages of preventing breakage or damage accidents of internal constituent components of the electronic control actuator, which are caused by collisions between the lever and the stopper, in consideration of variation in position control performance due to the variation in various kinds of components and to aged deterioration thereof, without collision between the lever and one of stoppers, that is, a stopper S2 in the fully-closed position or the other stopper, that is, the stopper S4 in the fully-opened position in the opening/closing operations of the lever.

According to the second apparatus of the invention, the angle signal converting device generates a target angle signal corresponding to a target angle included in an angle θc and regulates the generation of a target angle signal in such a way as to regulate or control the opening/closing operations of the lever within a mechanical operating region. Thus, the invention has advantages of more surely preventing breakage or damage accidents of internal constituent components of the electronic control actuator, which are caused by collisions between the lever and the stopper, in consideration of variation in position control performance due to the variation in various kinds of components and to aged deterioration thereof.

DETAILED DESCRIPTION OF THE PREFERRED EMBODIMENTS

Hereinafter, a mode for implementing an apparatus for controlling variable nozzles of a turbocharger according to the invention is described in detail with reference to the accompanying drawings.

Figure 1:
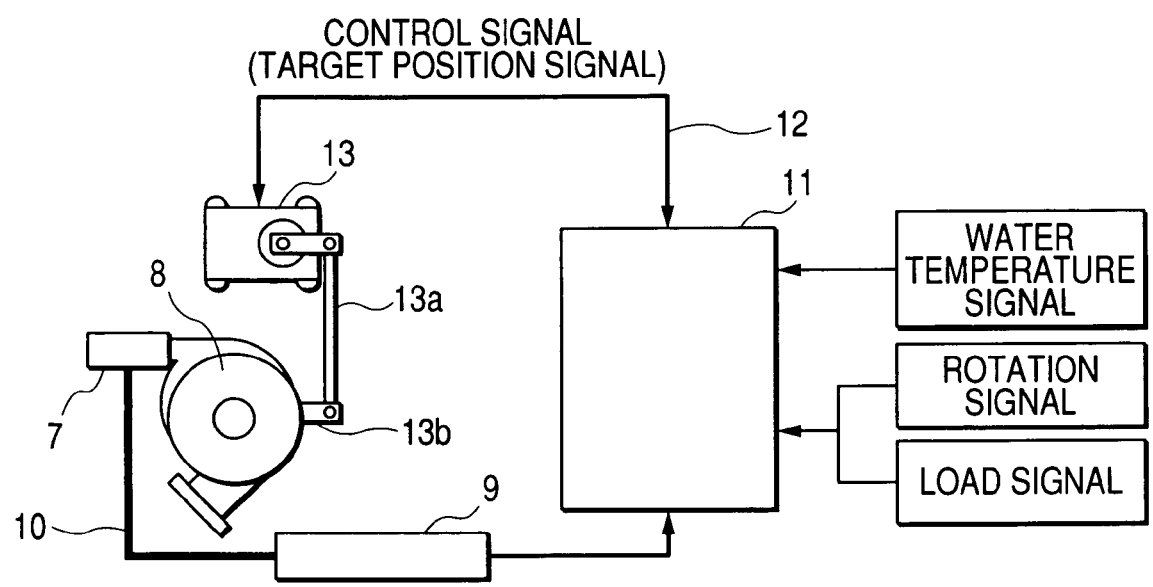
FIG. 1 is a configuration view showing a preferred mode for implementing an apparatus for controlling variable nozzles of a turbocharger according to the invention.

FIG. 1 is a configuration view showing a mode for carrying out the invention. This mode is described. Reference numeral 8 designates a turbocharger that is a system, which supercharges intake air. The turbocharger is provided with a compressor, which has a compressor wheel, and with a turbine (not shown) that is coaxially connected to the compressor by a rotor shaft and has a turbine wheel of the turbocharger 8, which is rotate-driven by exhaust gas. A pressure sensor 9 for detecting an intake pressure of intake air of the engine, that is, for detecting a boost pressure is connected to an air passage 7 of the turbocharger 8 through a hose 10. Further, variable nozzle members are disposed in the turbine of the turbocharger 8 in such a way as to surround the turbine wheel.

Reference numeral 11 designates an engine ECU, into which various kinds of sensors provided in the engine, for example, a water temperature sensor for detecting an engine water temperature, a rotation number sensor for detecting the number of rotation of the engine, which outputs a pulse signal at a certain crank angle, and an acceleration sensor for calculating an amount of load by detecting an amount of intake air through the use of an airflow meter or a driver's depressed amount of an accelerator pedal respectively introduce a water temperature signal, a rotation signal, and a load signal, that is, detection outputs.

Incidentally, although not shown in FIG. 1, additionally, an oxygen sensor, which is adapted to output different voltage signals according to oxygen concentration in exhaust gas, and a cylinder internal pressure sensor for detecting an internal pressure of an engine combustion chamber may be provided therein.

The operating state of the engine is discriminated according to these detection outputs. Then, the electronic control actuator 13 is driven and controlled through the control signal line 12. The electronic control actuator 13 connects a lever 13a and a rod 13b and controls the variable nozzle members (not shown) provided in the turbocharger 8.

The electronically controller actuator 13 is connected to the engine ECU 11 through the control signal line 12. Further, the engine ECU 11 performs computation according to information (signal) sent from various kinds of sensors provided in the engine.

Incidentally, the electronic control actuator 13 is attached to, for instance, the turbocharger 8.

Figure 2:
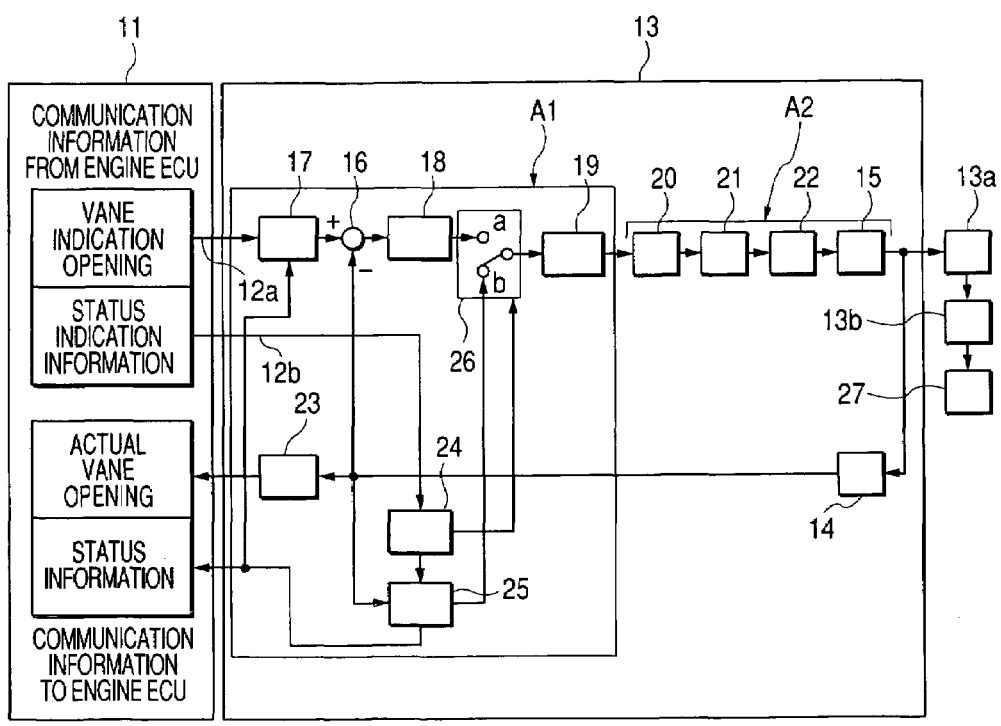
FIG. 2 is a block connection view showing an embodiment embodying an apparatus for controlling variable nozzles of a turbocharger according to the invention.

Next, FIG. 2 is a block connection view showing an embodiment of an apparatus for controlling variable nozzles of a turbocharger according to the invention. This embodiment is described hereinbelow.

The electronic control actuator 13 has an electronic control circuit portion A1 and a drive portion A2 that is driven and controlled by the electronic control circuit portion A1. The electronic control circuit portion A1 is supplied from the engine ECU 11 through control signal lines 12a, 12b with a vane indication opening signal and a status indication signal, respectively. The vane indication opening signal is introduced to an angle signal converting device 17, while the status indication signal is introduced to a status information detection device 24. The angle signal converting device 17 converts the vane indication opening signal to a target angle signal for designating a target angle by which an output shaft 15 turns. A comparing device 16 connected to an angle sensor 14 for detecting an angle of turn of the output shaft 15 is connected to the angle signal converting device 17. The angle sensor 14 supplies an actual angle signal, which indicates an angle of turn of the output shaft 15, to the comparing device 16. The comparing device 16 compares the actual angle signal with a target angle signal, and generates an output signal indicating the difference between both the signals. The output signal outputted from the comparing device 16 is supplied to a calculating device 18. The calculating device 18 differentiates or integrates the output signal of the comparing device 16 or performs proportional control thereon. An output signal of the calculating device 18 is supplied to a motor-driving-logic generating device 19 through a changeover switch 26 connected to the calculating device 18. An output signal of the motor-driving-logic generating device 19 is supplied to a motor driver 20 that drives and controls a motor 21. When the motor 21 is driven, a gear 22 connected to the motor 21 rotates, so that the output shaft 15 connected to the gear 22 rotates (ore turns). When the output shaft 15 rotates, a lever 13a connected to the output shaft 15 rotates (or turns), so that a rod 13b connected to the lever 13a moves. Consequently, the position and the opening of a nozzle vane 27 connected to the rod 13b change. An angle of rotation (or turn) of the output shaft 15 is detected by the angle sensor 14. The angle sensor 14 produces an actual angle signal indicating the detected angle. The actual angle signal produced by the angle sensor 14 is also supplied to a communication signal converting device 23. The communication signal converting device 23 converts the actual angle signal to an actual opening signal and supplies the actual opening signal to the engine ECU 11.

As described above, the comparing device 16 compares the actual angle signal with the target angle signal and generates the output signal representing the difference between both of these signals. The electronic control actuator 13 performs a negative feedback control. Thus, the motor 21 and the gear 22 turn the output shaft 15 until the actual angle signal becomes nearly equal to the target angle signal.

Figure 3:
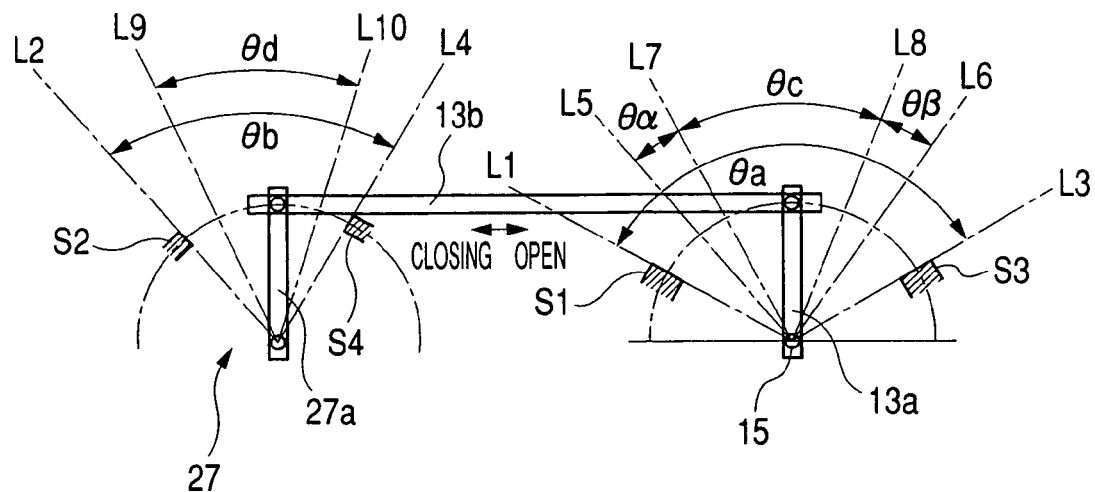
FIG. 3 is an explanatory view illustrating operations to which an electronic control actuator side and a variable nozzle side of the apparatus for controlling variable nozzles of a turbocharger according to the invention relate.
Figure 4:
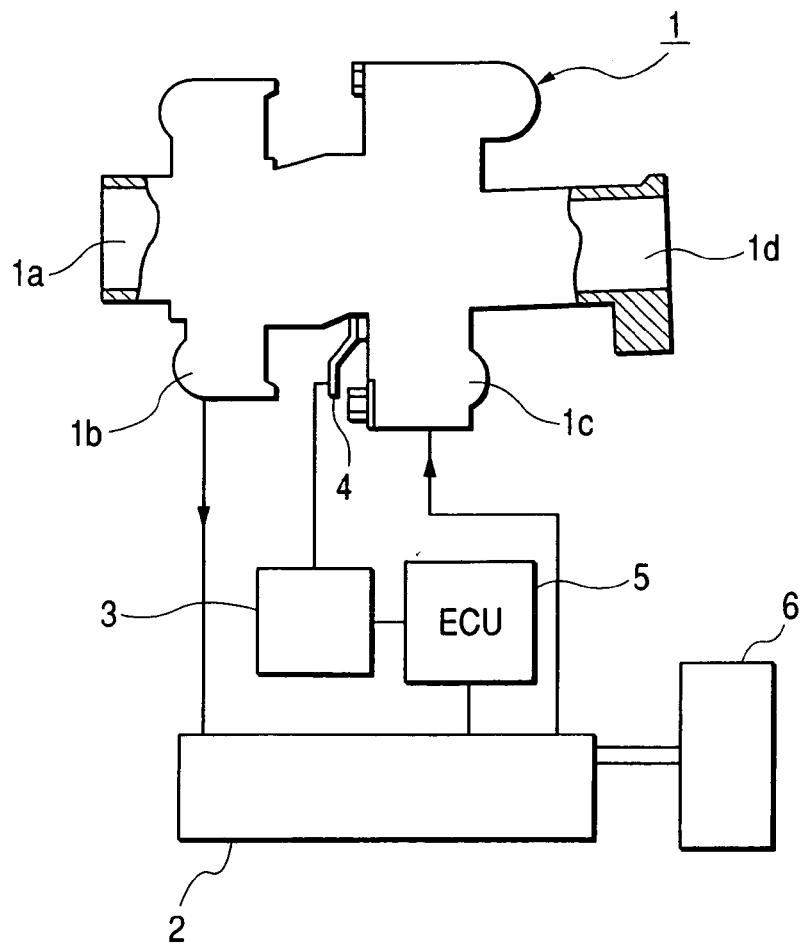
FIG. 4 is a configuration view showing a conventional apparatus for controlling variable nozzles of a turbocharger.

The turn of the output shaft 15 of the electronic control actuator 13 is transmitted to the nozzle vane 27 of the turbocharger 8 through the lever 13a and the rod 13b shown in FIG. 3. Thus, the opening of the nozzle vane 27 is controlled. Consequently, the opening of the nozzle vane 27 becomes equal to an opening determined by the vane indication opening signal supplied from the engine ECU 11.

Thus, according to the apparatus of the invention, the angle of turn of the output shaft 15 connected to the nozzle vane 27 is detected by the angle sensor 14. The actual angle signal representing the angle of turn of the output shaft 15 is generated by the angle sensor 14. Also, vane indication opening information associated with the nozzle vane 27, which is sent from the engine ECU 11, is converted by the angle signal converting device 17 into the target angle signal representing the target angle of the output shaft 15. Then, both of these signals are compared with each other. According to the difference between both the signals, the output shaft 15 is driven, so that the opening of the nozzle vane 27 is controlled in such a way as to be set to a target opening. Consequently, the opening of the nozzle vane 27 of the variable nozzle can be appropriately determined.

Incidentally, as illustrated in FIG. 3, the lever 13a is connected to the output shaft 15, and the rod 13b is connected to the lever 13a. Further, the lever 27a connected to the nozzle vane 27 is connected to the rod 13b. When the rod 13b is connected to neither the lever 13a nor the lever 27a, the lever 13a can rotate (or turn) within a range of an angle θa between the position L1 of a stopper S1 and the position L3 of a stopper S3. The lever 27a can rotate (or turn) within a range of an angle θb between the position L2 of a stopper S2 and the position L4 of a stopper S4. That is, the mechanical operating region of the electronically controlled single actuator 13 is regulated by the stopper S1 provided in a fully-closed position and the stopper S3 provided in a fully-opened position, which mechanically regulate the operating angle of the lever 13a. Furthermore, the mechanical operating region of the nozzle vane 27 of the variable nozzle is regulated by the stopper S2 provided in a fully-closed position and the stopper S4 provided in a fully-opened position, which mechanically regulate the operating angle of the lever 27a.

The angle sensor 14 employs the position L1, in which the lever 13a collides with the stopper S1 provided in the fully closed position in a state wherein the rod 13b is connected to neither the lever 13a nor the lever 27a, as a reference position and detects an angle of rotation (or angle of turn) of the lever 13a within a range of the angle θa therefrom to the position L3. The length of the lever 13a is set to be almost equal to that of the lever 27a. The angle θa is set to be larger than the angle θb. When the rod 13b is connected to the lever 13a and the lever 27a, the angle of rotation (or angle of turn) of the lever 13a is regulated by the angle of rotation (or angle of turn) of the lever 27a and approximately equal to the angle θb. That is, when the lever 27a collides with the stopper S2 provided in the fully-closed position, the lever 13a stops in a position L5 without colliding with the stopper S1 provided in the fully-closed position. Further, when the lever 27a collides with the stopper S4 provided in the fully-opened position, the lever 13a stops in a position L6 without colliding with the stopper S3 provided in the fully-opened position.

As described above, the angle θa, within the range of which the lever 13a can operate, is larger than the operating angle θb of the lever 27a. Therefore, the lever 13a can sufficiently rotate (or turn) the lever 27a within the range of the angle θb from the position L2 to the position L4. On the other hand, when the lever 13a reaches the position L5 or L6, the lever 27a collides with the stopper S2 provided in the fully closed position or the stopper S4 provided in the fully opened position. When the lever 27a severely collides with the stopper S2 provided in the fully closed position or the stopper S4 provided in the fully opened position, a reaction force is transmitted to the gear 22 through the rod 13b, the lever 13a, and the output shaft 15. There is the possibility that the output shaft 15 and the gear 22 are damaged. In the apparatus for controlling the variable nozzle according to the invention, the lever 27a is prevented from colliding with the stopper S2 provided in the fully closed position or with the stopper S4 provided in the fully opened position. Thus, the gear 22 is prevented from being damaged. That is, in the apparatus for controlling the variable nozzle according to the invention, in a state where the location of the stopper S2, which is provided in the fully closed position, or of the stopper S4, which is provided in the fully opened position, is set according to the performance required by the turbocharger. and where the angle θb, within the range of which the lever 27a can rotate, is determined, the lever 13a is controlled so that the lever 27a is controlled within a range of an angle θd that is smaller than the angle θb.

When the status indication signal is introduced to the status information detection device 24 from the engine ECU 11 through the control signal line 12b, the status information detection device 24 generates a lever control range setting indication signal and supplies the lever control range setting indication signal to a lever control range setting device 25. When receiving the lever control range setting indication signal, the lever control range setting device 25 changes the position of the switch 26 to a position shown in FIG. 2 and supplies a lever control range setting signal, according to which the motor 21 can be rotated at a low speed, to the motor-driving-logic generating device 19. In a case where the motor 21 is rotated at a low speed, and where, for example, the lever 13a is rotated (or turned) toward the position L1 or L5, the lever 27a is rotated (or turned) toward the position L2, that is, the stopper S2. Eventually, the lever 27a collides with the stopper S2 in the position L2 and stops. During the lever 13a rotates (or turns) toward the position L5, the actual angle signal generated by the angle sensor 14 is supplied to the lever control range setting device 25 and monitored. When the lever 27a collides with the stopper S2 in the position L2 and stops rotating (or turning), the rotation (or turn) of the lever 13a is stopped in the position L5, so that the actual angle signal comes not to change. The actual angle signal in the position L5 is stored in the lever control range setting device 25. At that time, the lever control range setting device 25 computes an angle signal in a position L7, to which the lever 13a is rotated (or turned) from the position L5 by a predetermined angle θα, according to the actual angle signal in the position L5 and stores the computed angle signal as a limit position signal.

Subsequently, the lever control range setting device 25 supplies a signal, according to which the lever 13a is rotated (or turned) toward the position L6, to the motor-driving-logic generating device 19. Then, the lever 13a is rotated (or turned) toward the position L6 at a low speed.

When the lever 13a is rotated (or turned) toward the position L3 or L6, the lever 27a is rotated (or turned) toward the position L4, that is, toward the stopper S4. Eventually, the lever 27a collides with the stopper S3 in the position L4 and stops. During the lever 13a rotates (or turns), the actual angle signal generated by the angle sensor 14 is supplied to the lever control range setting device 25 and monitored. When the lever 27a collides with the stopper S3 in the position L4 and stops, the rotation (or turn) of the lever 13a is stopped in the position L6, and the actual angle signal comes not to change. The actual angle signal in the position L6 is stored in the lever control range setting device 25. At that time, the lever control range setting device 25 computes an angle signal in a position L8, to which the lever 13a is rotated (or turned) from the position L6 by a predetermined angle θβ, according to the actual angle signal in the position L6 and stores the computed angle signal as a limit position signal.

Then, the angle signal in the position L7 and the angle signal (the limit position signal) in the position L8 are supplied from the lever control range setting device 25 to the angle signal converting device 17 and the engine ECU 11. The angle signal converting device 17 receives the angle signal in the position L7 and the angle signal in the position L8. When converting the vane indication opening signal, which is supplied form the engine ECU 11 through the control signal line 12a, to a target angle signal for designating a target angle of the output shaft 15, the angle signal converting device 17 converts the vane indication opening signal only to a target angle signal representing an angle within a range of the angle θc between the positions L7 and L8, and converts the vane indication opening signal to neither an angle signal corresponding to the range between the positions L7 and L5 nor an angle signal corresponding to the range between the positions L8 and L6. Therefore, the lever 13a rotates (or turns) within a range of the angle θc between the positions L7 and L8. Consequently, the lever 27a rotates (or turns) within a range of the angle θd between positions L9 and L10. Further, because the positions L9 and L10 are away from the positions L2 and L4, respectively, the lever 27a collides with neither the stopper S2 nor the stopper S4.

That is, initial setting is performed so that the lever 13a rotates (or turns) between the position L7, to which an offset region θα exists from the position L5 of the lever 13a corresponding to the position L2 where the lever 27a collides with the stopper S2, and the position L8, to which an offset region θβ exists from the position L6 of the lever 13a corresponding to the position L4 where the lever 27a collides with the stopper S4, and that the lever 13a goes over neither the position L7 nor the position L8. Therefore, even when the angle of rotation (or the angle of turn) θd of the lever 27a slightly changes due to the variation in external load, change in the voltage supplied to the motor 21, change in temperature conditions, or aged deterioration in the inner mechanism, the lever 27a collides with neither the stopper S2 nor the stopper S4.

As described above, in the apparatus for controlling the variable nozzles of the turbocharger according to the invention, the lever 27a does not collides against the stopper S2, which is placed in the fully closed position, or the stopper S4 placed in the fully opened position. Thus, the rod 13b, the lever 13a, and the output shaft 15 do not receive a reaction force to be generated at the collision. Consequently, there is no possibility that the output shaft 15 and the gear 22 are damaged.

What is claimed is:

1. An apparatus for controlling a variable nozzle of a turbocharger, which has an electronic control actuator for controlling an opening of a vane of said variable nozzle of said turbocharger according to an indication signal from an engine electronic control unit for controlling an engine provided with said turbocharger having said variable nozzle, wherein said electronic control actuator has an output shaft enabled to rotate within a range of an angle θa; and wherein said variable nozzle is enabled to move within a range of an angle θb (θb<θa) between a first stopper and a second stopper, said apparatus comprising:

an angle sensor for detecting an angle, by which said variable nozzle moves within a range of said angle θb between said first stopper and said second stopper, in terms of a movement angle of said output shaft and for generating an angle signal; and an electric control circuit, to which the angle signal generated by said angle sensor is supplied, for storing angle signals, respectively, generated by said angle sensor in a position, in which said variable nozzle collides with said first stopper, and a position, in which said variable nozzle collides with said second stopper, as a first collision position signal and a second collision position signal, for storing angle signals, which respectively differ from the first collision position signal and the second collision position signal by a predetermined first offset angle θα and a predetermined second offset angle θβ, as a first limit position signal and a second limit position signal, and for generating a control signal, according to which said output shaft of said electronic control actuator is driven within a range of an angle θc (θc< θb) between a first limit position and a second limit position, which are respectively represented by the first limit position signal and the second limit position signal.

2. The apparatus for controlling variable nozzles of a turbocharger according to claim 1, wherein:

said electronic control actuator comprises:

a motor driver connected to said electronic control circuit;

a motor portion driven by said motor driver; and a decelerator connected to said motor portion and to said output shaft of said vane of said variable nozzle of said turbocharger, wherein said apparatus further comprises:

an angle signal converting device, to which an opening indication information designating an opening of said vane of said variable nozzle sent from said engine electronic control unit is supplied, for converting the opening indication information to a target angle signal representing a target angle signal of said output shaft;

a comparing device for comparing the target angle signal generated by said angle signal converting device with an actual angle signal representing an actual angle of said output shaft, which is generated by said angle sensor; and a lever control range setting device for performing a computation on the angle signals sent from said angle sensor, for storing resultant signals as said first collision position signal and said second collision position signal, for storing angle signals representing angles, respectively, differing from said first limit position and said second limit position by a predetermined first offset angle θα and a predetermined second offset angle θβ as said first limit position signal and said second limit position signal, and for supplying the first limit position signal and the second limit position signal to said angle signal converting device, and wherein said angle signal converting device generates a target angle signal representing a target angle included in the range of the angle θc.

* * * * *